(12) United States Patent
Burrows et al.

(10) Patent No.: US 12,012,830 B1
(45) Date of Patent: Jun. 18, 2024

(54) DOME CAP AND TAILPLUG ASSEMBLY

(71) Applicant: FLOWCO PRODUCTION SOLUTIONS, LLC, Spring, TX (US)

(72) Inventors: Stephen Burrows, Katy, TX (US); Brandon Lee Dobbs, Aledo, TX (US); Matthew Young, Magnolia, TX (US)

(73) Assignee: FLOWCO PRODUCTION SOLUTIONS, LLC, Spring, TX (US)

( * ) Notice: Subject to any disclaimer, the term of this patent is extended or adjusted under 35 U.S.C. 154(b) by 0 days.

(21) Appl. No.: 18/405,908

(22) Filed: Jan. 5, 2024

(51) Int. Cl.
    *E21B 43/12* (2006.01)
    *B60C 29/06* (2006.01)
    *F16L 55/11* (2006.01)

(52) U.S. Cl.
    CPC .......... *E21B 43/123* (2013.01); *B60C 29/066* (2013.01); *F16L 55/1108* (2013.01)

(58) Field of Classification Search
    CPC ...... E21B 43/123; E21B 33/12; E21B 33/124; E21B 43/122; F16K 27/12; B60C 29/066; F16L 55/1108; F16L 37/60; F16L 37/006; F16L 37/38
    See application file for complete search history.

(56) References Cited

U.S. PATENT DOCUMENTS

| | | | | |
|---|---|---|---|---|
| 7,631,664 | B1* | 12/2009 | Mailand | F16L 55/1108 138/90 |
| 9,447,909 | B2* | 9/2016 | Smith | F16L 15/04 |
| 2008/0111322 | A1* | 5/2008 | Otsubo | F16L 55/1108 277/654 |
| 2015/0013350 | A1* | 1/2015 | Ames | F17C 9/02 62/48.1 |
| 2017/0368903 | A1* | 12/2017 | Kesler | B60H 1/00485 |
| 2019/0047335 | A1* | 2/2019 | Balistreri | F16K 15/06 |
| 2021/0054725 | A1* | 2/2021 | Salihbegovic | E21B 43/123 |
| 2021/0231226 | A1* | 7/2021 | Wu | F16K 27/0209 |

* cited by examiner

*Primary Examiner* — Kelsey E Cary
(74) *Attorney, Agent, or Firm* — FisherBroyles, LLP; Jason P. Mueller

(57) ABSTRACT

A dome cap and tail plug assembly for a flow control device include a dome that attaches to an upper end of a body of the flow control device and a tail plug that screws into a top of the dome cap. A seal is provided between the dome cap and the tail plug. The seal can be formed by one or more sealing elements, such as O-rings, positioned between the dome cap and the tail plug. The seal can also be provided by engagement between a shoulder on the tail plug bearing against an end face of the dome cap. Also, threads used to couple the tail plug to the dome cap could be conical threads, which also help to provide a seal between the dome cap and the tail plug.

21 Claims, 3 Drawing Sheets

DOME CAP AND TAILPLUG ASSEMBLY

BACKGROUND OF THE INVENTION

The invention relates to flow control devices which are used in connection with gas lift assist systems which are employed in oil and gas wells. When a gas lift assist system is installed on an oil or gas well, one or more flow control devices are located within the well. An example of such a flow control device is illustrated in FIG. 1.

The flow control device 100 includes housing, inside of which is a valve mechanism (not shown). The valve mechanism is opened and closed by a pressure operated mechanism. One end of the pressure mechanism includes a bellows 110 which can move along the longitudinal axis of the device inside a gas dome 102.

The gas dome 102 is provided in the upper end of the flow control device 100. The gas dome is filled with a pressurized gas such as nitrogen at a specific pressure. A pressure differential between pressure outside the flow control device 100 and pressure inside the gas dome 102 serves to open and close the valve mechanism inside the flow control device 100. When pressure outside the flow control device 100 becomes sufficiently high, the bellows 110 moves upward into the gas dome 102 against the pressure in the gas dome 102 to open the valve mechanism. On the other hand, when the pressure outside the of the flow control device 100 becomes sufficiently low, the pressure of the gas within the gas dome 102 pushes the bellows 110 axially downward to close the valve mechanism.

As illustrated in FIGS. 1 and 2, a dome cap 104 is attached to the upper end of the housing of the flow control device 100. A valve core 106 is mounted in the dome cap 104. A tail plug 108 mounted on the upper end of the dome cap 104 seals off the valve core 106 from gas and fluids located outside the flow control device 100.

Gas is introduced into the gas dome 102 via the valve core 106. To charge the gas dome 102 with pressurized gas, the tail plug 108 is removed from the upper end of the of the dome cap 104. The end of a gas supply line is then mounted where the tail plug 108 was located, and pressurized gas is delivered into the space between the end of the gas supply line and the valve core 106. The valve core 106 is pressure operated. Thus, the pressurized gas delivered into this space causes the valve core 106 to open, which allows the pressurized gas to flow into the gas dome 102 via the valve core 106. Once a sufficient amount of gas has been introduced into the gas dome 102 such that the gas within the gas dome 102 is at a target pressure, the supply of pressurized gas via the gas supply line is shut off. This causes the valve core 106 to close, resulting in the gas dome 102 being charged with pressurized gas at the target pressure.

The gas supply line is then removed and the tail plug 108 is re-inserted into the dome cap 104. The tail plug 108 is intended to prevent gas and liquids from within the well from penetrating into the space between the tail plug 108 and the valve core 106. If fluid (liquid and/or gas) were able to penetrate into this space, it could cause the valve core 106 to open, admitting the penetrating fluid (liquid and/or gas) as into the gas dome 102. This can contaminate the internal mechanisms in the flow control device and alter the pressure of the gas in the gas dome 102, which will likely cause the flow control device to function improperly or not as intended.

In addition, to the extent any gas in the gas dome 102 leaks upward past the valve core 106, due to a failure of the valve core 106 or the seal between the valve core 106 and the dome cap 104, the tail plug 108 prevents any pressurized gas from escaping further out of the flow control device 100.

As depicted in FIG. 2, the dome cap 104 includes external threads 116 which mate with internal threads 114 of the housing of the flow control device 100 to attach the dome cap 104 to the housing of the flow control device 100. Engagement between the end face 103 of the housing of the flow control device 100 and a shoulder 113 on the dome cap 104 helps to provide a gas-tight seal between the dome cap 104 and the gas dome 102 of the flow control device 100. Also, one or more dome cap O-rings 112 are located in circumferential grooves on the exterior of the dome cap 104. The dome cap O-rings 112 also help to provide a seal between gas dome 102 of the flow control device 100 and the exterior cylindrical surface of the dome cap 104.

Two passageways are formed along the central longitudinal access of the dome cap 104. The valve core 106 is mounted in a small diameter valve core receiving aperture 107 of the dome cap 104. A larger diameter portion at the top end of the dome cap 104 receives the tail plug 108.

External threads 122 on the tail plug 108 engage with internal threads 121 on the dome cap 104 to mount the tail plug 108 to the dome cap 104. A single tail plug O-ring 117 is located in a circumferential groove on the exterior cylindrical surface of the tail plug 108. The tail plug O-ring 117 forms a seal between the tail plug 108 and the interior cylindrical bore of the dome cap 104 in which the tail plug 108 is mounted. In addition, a crush gasket 115 may be installed between the tail plug 108 and the dome cap 104. The crush gasket 115 is trapped between a tail plug shoulder 109 on the tail plug 108 and a corresponding dome cap shelf 105 on the interior bore of the dome cap 104.

The tail plug O-ring 117 and the crush gasket 115 together are intended to prevent the ingress of any gas or fluid from outside the flow control device 100 into the tail volume 120 located between the lower end of the tail plug 108 and the upper end of the valve core 106. In addition, to the extent any of the gas in the gas dome 102 leaks past the valve core 106 into the tail volume 120, the tail plug O-ring 117 and the crush gasket 115 help to prevent that pressurized gas from leaking outside the flow control device 100.

Unfortunately, the design depicted in FIG. 2 is subject to failure, possibly because of a combination of factors. The exterior top of the flow control device 100 is subjected to whatever fluids (liquid and/or gas) that are present within the wellbore. If the flow control device 100 is positioned deep within the wellbore, the pressure of the fluid and gasses surrounding the flow control device 100 can be quite high. The high pressure gases and fluid can cause the tail plug O-ring 117 to fail, which can allow gas and fluid outside the flow control device 100 to pass the tail plug O-ring 117 and travel inward towards the tail volume 120. Likewise, the high pressure fluid (liquid and/or gas) that passes the tail plug O-ring 117 can also pass the crush gasket 115 and enter the tail volume 120. As explained above, if pressurized fluid or gas enters the tail volume 120, the pressurized fluid or gas in the tail volume 120 can cause the valve core 106 to open, allowing the penetrating fluids (liquid and/or gas) to enter the gas dome 102, impeding the intended performance of the flow control device.

DETAILED DESCRIPTION

Figure 1:
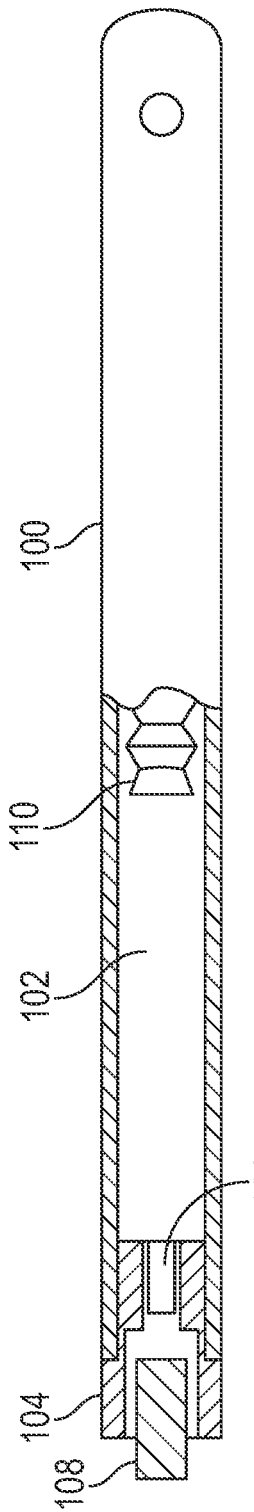
FIG. 1 is a partial cross sectional view of a flow control device.
Figure 2:
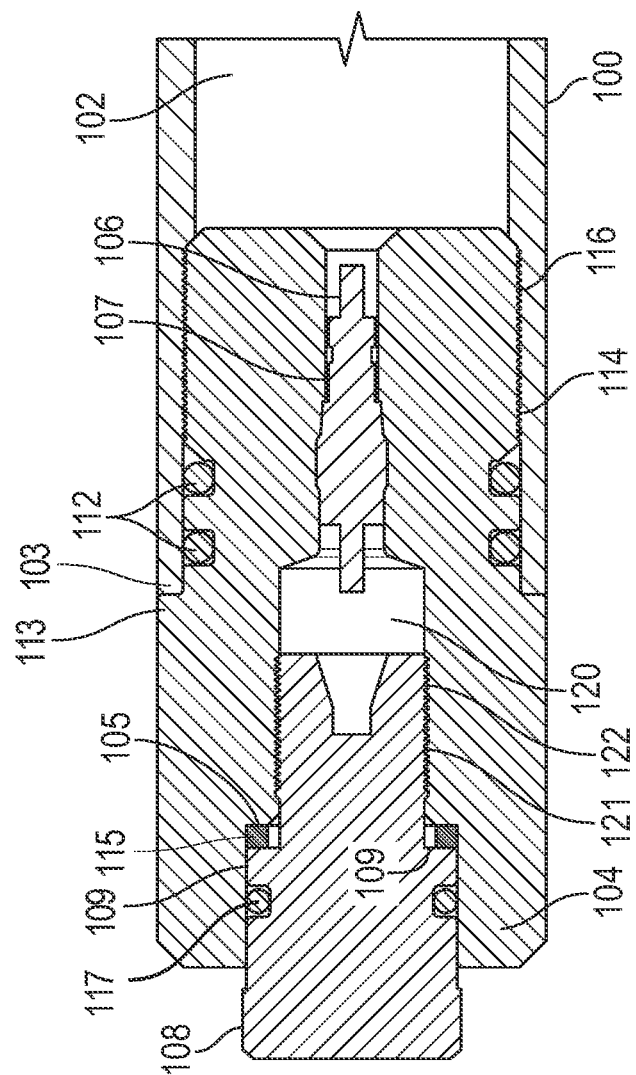
FIG. 2 is a cross sectional view of the upper end of a flow control device showing a dome cap and tail plug.
Figure 3:
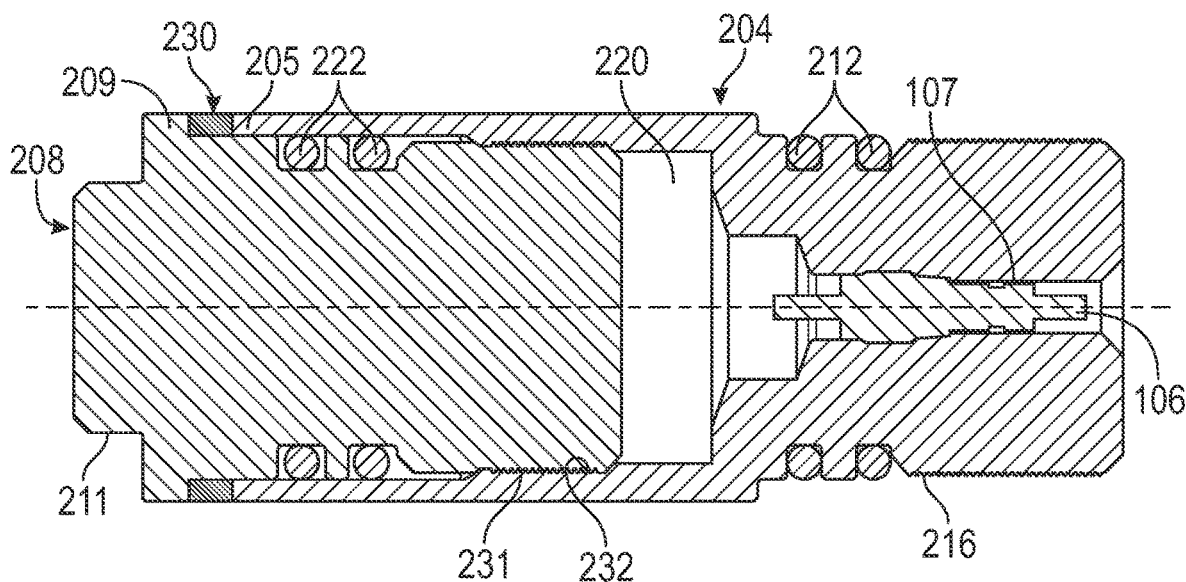
FIG. 3 is a cross sectional view of a first embodiment of a tail plug and dome cap.

FIG. 3 is a cross sectional view of a new design for a dome cap and tail plug assembly which is configured to provide a better seal between the dome cap 204 and the tail plug 208 than the embodiment illustrated in FIG. 2. In this embodiment, external threads 216 are still provided on the lower portion of the dome cap 204 in order to attach the dome cap 204 to an internal threaded bore at the upper end of the housing of the flow control device 100. Two dome cap O-rings 212 are provided in circumferential grooves on the exterior cylindrical surface of the dome cap 204 just above the external threads 216. A valve core 106 is mounted in a narrow diameter valve core receiving aperture 107 of the dome cap 204.

A large diameter cylindrical bore is formed at the upper end of the dome cap 204. Internal threads 231 are formed on the interior cylindrical bore to mate with external threads 232 of the tail plug 208. The diameter of the internal bore of the dome cap 204 which receives the tail plug 208 is significantly greater than the corresponding diameter of the internal bore of the dome cap 104 illustrated in FIG. 2. Likewise, the diameter of the tail plug 208 is greater than the diameter of the tail plug 108 of the embodiment shown in FIG. 2.

In the embodiment illustrated in FIG. 3, two tail plug O-rings 222 are located in two corresponding circumferential grooves formed on the external cylindrical surface of the tail plug 208. The tail plug O-rings 222 form a seal between the tail plug 208 and the internal bore of the dome cap 204. The diameter of the tail plug O-rings 222 in this design is larger than the diameter of the tail plug O-rings 117 used in the design illustrated in FIG. 2. The larger diameter O-rings are more robust and it requires more energy (mechanical and thermal) to extrude them out of the circumferential grooves than the tail plug O-ring 117 in the design illustrated in FIG. 2. Thus, the seal provided by the larger diameter O-rings 222 in the design illustrated in FIG. 3 is less likely to fail due to the ingress of fluids or gas from the surrounding well. The larger diameter tail plug O-rings 222 can also be formed of a harder material, which also helps prevent failure of the seal.

While the designs disclosed herein employ O-rings to form all or a part of the seal between the dome cap 204 and the tail plug 208, other sealing devices could be used in place of O-rings. Thus, the disclosure of O-rings should in no way be considered limiting. Also, one or more mechanical sealing devices alone could be used to isolate the valve core 106 from the gas and fluids surrounding the flow control device 100. Thus, some embodiments may not include any sealing devices such as O-rings.

The gas dome 102 of a flow control device is charged with pressurized gas by screwing the end of a gas supply line into the internal threads 232 of the cylindrical bore of the dome cap 204. In the embodiment illustrated in FIG. 3, the diameter of this internal bore is greater than the diameter of the corresponding internal bore of the embodiment illustrated in FIG. 2. This means that a new fitting could be used on the gas supply line to accommodate the larger diameter internal bore of the new dome cap 204.

However, the diameter of the internal bore on the new dome cap 204 design illustrated in FIG. 3 is configured to be the same as the internal diameter of the top end of the housing of the flow control device 100. This means that an old dome cap 104 as illustrated in FIG. 2 can be screwed into the internal threads 232 of the new dome cap 204 to accomplish the gas charging operation. The original sized gas supply line can then be screwed into the internal threads 121 of the old dome cap 104 to perform the gas charging operation.

In this embodiment, a sacrificial gasket 230 is located between a tail plug shoulder 209 on the tail plug 208, and the end face 205 of the dome cap 204. The sacrificial gasket 230 is intended to provide an additional seal between the tail plug 208 and the dome cap 204 in order to prevent fluids outside the flow control device from penetrating into the tail volume 220 between the tail plug 208 and the dome cap 204.

Because the sacrificial gasket 230 is considerably larger than the corresponding crush gasket 114 of the embodiment illustrated in FIG. 2, the larger diameter sacrificial gasket 230 may provide a more reliable seal. The crush gasket 230 could be formed from a variety of different materials or be formed as a composite structure that includes more than one material. However, anodic materials such as Br—Be or stainless steel-sintered graphite are particularly suitable. For example, the sacrificial gasket 230 could be manufactured from a copper alloy or bronze beryllium copper. The sacrificial gasket 230 could also be formed from a more inert material such as graphite.

The sacrificial gasket 230 which helps to provide a seal between the tail plug 208 and the dome cap 204 prevents the ingress of fluids towards the tail plug O-rings 222. This, in turn, helps to prevent the swelling or chemical degradation of the tail plug O-rings 222 caused by the ingress of liquid or gases.

In the design illustrated in FIG. 2, there is nothing to prevent fluid or gases from penetrating the interface between the tail plug 108 and the dome cap 104. As a result, any fluids or gases penetrating this circumferential interface can then attack the single tail plug O-ring 117 in that design, leading to degradation and failure of the tail plug O-ring 117. Providing the sacrificial gasket 230 in the embodiment shown in FIG. 3 helps to prevent gases or fluids from outside the flow control device from reaching the tail plug O-rings 22, helping to prevent failure of the tail plug O-rings 222 in the design illustrated in FIG. 3.

Figure 4:
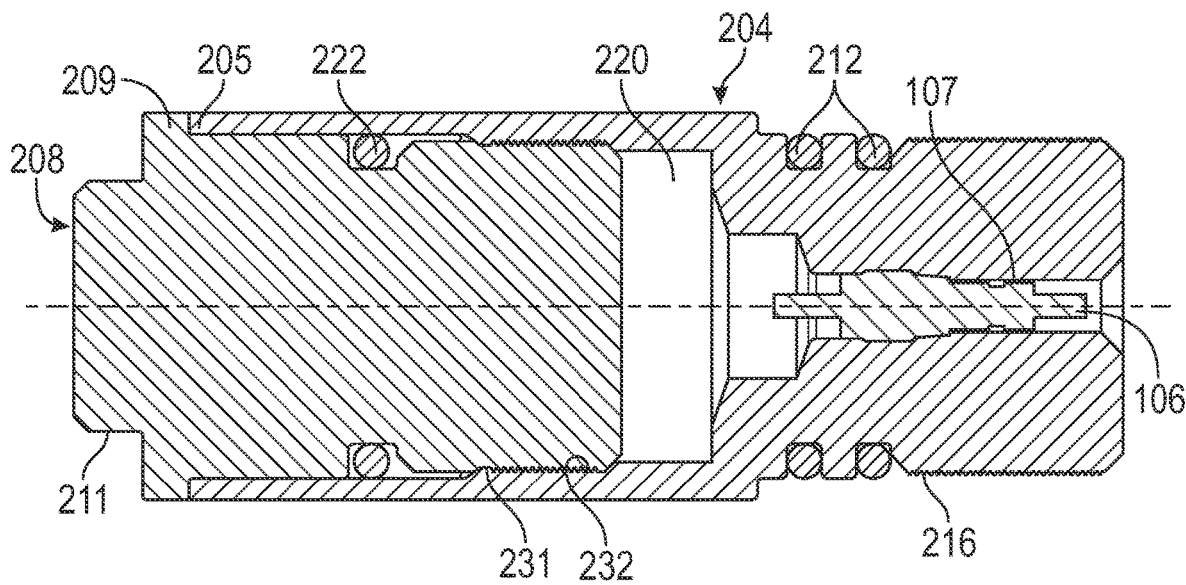
FIG. 4 is a cross sectional view of a second embodiment of a tail plug and dome cap.

Although two tail plug O-rings 222 are provided in the embodiment illustrated in FIG. 3, a greater or lesser number of tail plug O-rings 22 could be used. FIG. 4 illustrates an alternate embodiment which includes a single tail plug O-ring 222. In addition, the embodiment illustrated in FIG. 4 does not include a sacrificial gasket 230 between the tail plug shoulder 209 and the end face 205 of the dome cap 204. Instead, in the embodiment illustrated in FIG. 4 the tail plug shoulder 209 of the tail plug 208 directly contacts the end face 205 of the dome cap 204 to provide a metal-to-metal seal. By controlling the torque applied to screw the tail plug 208 into the dome cap 204, one can elastically deform the metal of those either or both of those two items, rather than plastically deforming them. Elastic deformation of the tail plug 208 and/or dome cap 204 provides a functional metal-to-metal seal without harming either of those elements.

Figure 5A:
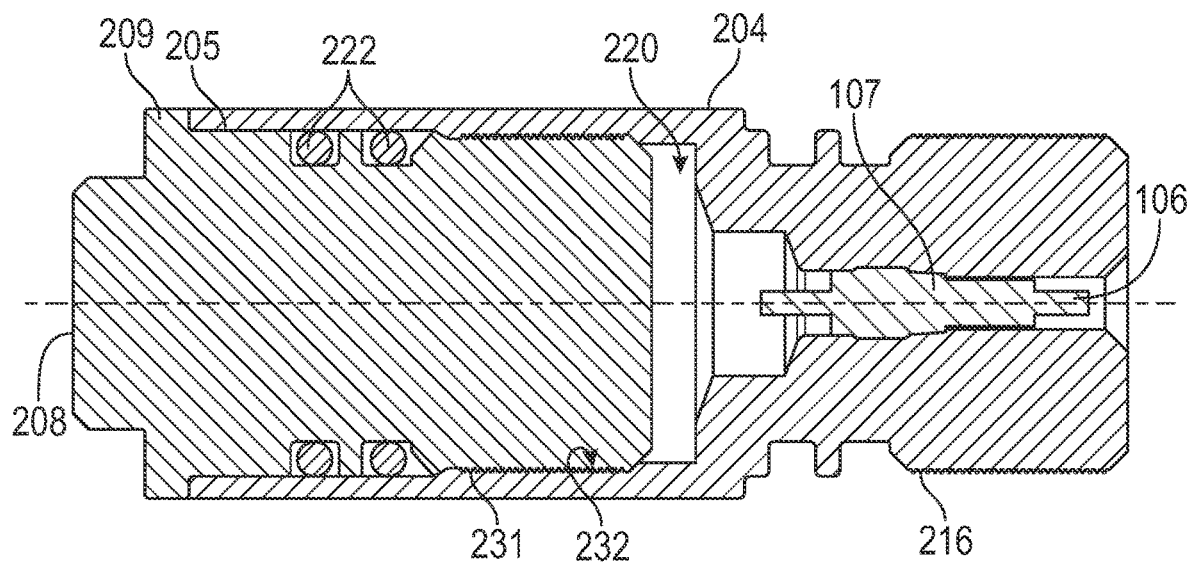
FIG. 5A is a cross sectional view of a third embodiment of a dome cap and tail plug.
Figure 5B:
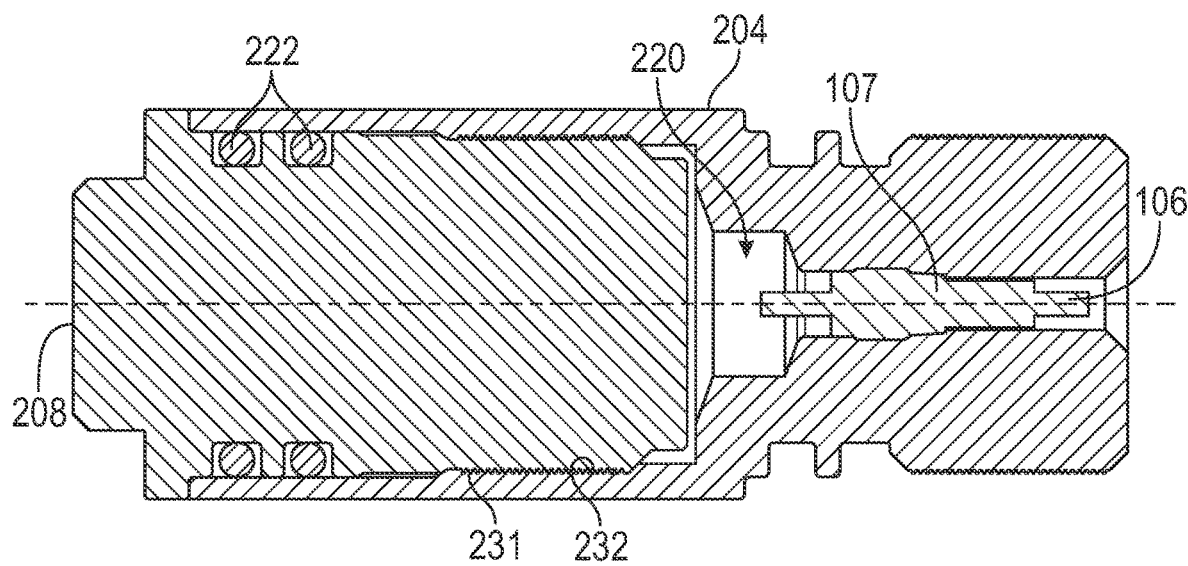
FIG. 5B is a cross sectional view of a fourth embodiment of a dome cap and tail plug.

FIGS. 5A and 5B illustrate two alternate embodiments of a dome cap and tail plug assembly. The embodiment illustrated in FIG. 5A shows the tail plug shoulder 209 directly contacting the end face 205 of the dome cap 204 to provide a metal-to-metal seal. In addition, this embodiment includes two tail plug O-rings 222 to provide a seal between the tail plug 208 and the dome cap 204. Further, this embodiment shows a tail volume 220 between the lower end of the tail plug 208 and the valve core 106.

If the valve core 106 were to malfunction, of if the seal between the valve core 106 and the valve core receiving aperture 107 leaks, pressurized gas from the gas dome 102 of the attached flow control device 100 could travel from the gas dome 102 to the tail volume 220. Because the gas in the gas dome is at a relatively high pressure, the high pressure gas in the tail volume 220 would tend to push the tail plug 208 outward away from the dome cap 204. This causes a potential hazard, because when a maintenance technician unscrews the tail plug 208 from the dome cap 204, pressurized gas in the tail volume 220 will be pushing the tail plug 208 outward away from the dome cap 204. If the threads 231/232 on the tail plug 208 and dome cap 204 disengage before the tail plug O-rings 222 emerge from the interior bore of the dome cap 204, the pressurized gas in the tail volume 222 could forcibly eject the tail plug 208 from the dome cap 204 causing a potential hazard to the maintenance technician.

The embodiment illustrated in FIG. 5B is intended to solve this problem. In the embodiment illustrated in FIG. 5B, the two tail plug O-rings 222 have been moved further back along the tail plug 208. In addition, the dimensions of the tail plug 208 and the dome cap 204 have been adjusted such that when the tail plug 208 is fully inserted into the dome cap 204, there is very little tail volume 220 in which pressurized gas can collect.

When a maintenance technician is removing the tail plug 208 from the dome cap 204, the threads 231/232 between these two items will remain engaged until after the tail plug O-rings 222 emerge from the interior bore of the dome cap 204. This will allow any pressurized gas held in the tail volume 220 to escape past the threads before the threads 231/232 disengage. This prevents a problem with forcible ejection of the tail plug 208 from the dome cap 204. In addition, because there is a reduced tail volume 220, the force of any pressurized gas within the tail volume is likewise reduced.

The added advantage of the reduced 220 volume also allows to minimize the change in target pressure of the flow control device in the eventuality of dome pressure (nitrogen) leaking across valve core 106/107. As such, this reduced volume 220 will mitigate any failure of the valve core 106 and keep the flow control device within operating performance limits.

In the foregoing embodiments, the seal between the dome cap and the tail plug was ensured using one or more tail plug O-rings, and a seal between a shoulder on the tail plug and the end face of the dome plug. In some embodiments, a sacrificial gasket was interposed between the shoulder on the tail plug and the end face of the dome cap. In alternate embodiments, the threads that secure the tail plug to the dome cap could be conical in nature, such as NPT or NPTF threads, and those conical threads could help to provide the seal between the dome cap and the tail plug. Indeed, in some embodiments, conical threads between the dome cap and the tail plug could be the primary or only way of sealing the tail plug to the dome cap. In other words, in some embodiments, there may be no tail plug O-rings and there may be no engagement between a shoulder on the tail plug and the end face of the dome cap. However, conical threads between the dome cap and the tail plug could nevertheless provide an effective seal.

The foregoing description focused on a mechanism and method for sealing a fitting that enclosed and protects a valve core of a flow control device used in connection with gas assist systems employed in the oil and/or gas industry. However, the disclosed mechanisms and methods are equally applicable to flow control devices used in the recovery of any fluids, whether conventional, high pressure and/or high temperature, stored in downhole reservoirs. For example, the disclosed devices and methods could be used in connection with extraction of materials from salt domes and/or lithium extraction industries where flow control devices (FCD) are used to lift downhole fluids. Also, the disclosed systems and methods could also be used for any application relying on o-rings and elastomeric seals as a primary boundary to pressure activated valves.

The invention claimed is:

1. A dome cap assembly for a flow control device, comprising:
   a dome cap including:
      a cylindrical dome cap body having a first end that is configured to be mounted to a housing of a flow control device;
      at least one circumferential groove located on an external cylindrical surface of the cylindrical dome cap body, each at least one circumferential groove being configured to receive a sealing element;
      an internal valve core receiving aperture located at the first end of the cylindrical dome cap body; and
      an internal tail plug receiving aperture located at a second end of the cylindrical dome cap body, wherein the tail plug receiving aperture communicates with the internal valve core receiving aperture; and
   a tail plug configured to be at least partially mounted in the internal tail plug receiving aperture, the tail plug including:
      a cylindrical tail plug body;
      at least one circumferential groove located on an external cylindrical surface of the cylindrical tail plug body, each at least one circumferential groove being configured to receive a sealing element;
      a shoulder on the external cylindrical surface of the cylindrical tail plug body, wherein the shoulder is configured to bear against an end face of the cylindrical dome cap body or a gasket positioned between the shoulder and the end face of the cylindrical dome cap body,
   wherein an external diameter of the cylindrical tail plug body is greater than 50% of an external diameter of the second end of the cylindrical dome cap body.

2. The dome cap assembly of claim 1, wherein the external diameter of the cylindrical tail plug body is greater than 70% of the external diameter of the second end of the cylindrical dome cap body.

3. The dome cap assembly of claim 1, wherein the external diameter of the cylindrical tail plug body is greater than 85% of the external diameter of the second end of the cylindrical dome cap body.

4. The dome cap assembly of claim 1, wherein the at least one circumferential groove located on the external cylindrical surface of the cylindrical tail plug body comprises two circumferential grooves.

5. The dome cap assembly of claim 1, further comprising a sealing element positioned between the shoulder of the cylindrical tail plug body and the end face of the cylindrical dome cap body when the tail plug is mounted in the internal tail plug receiving aperture of the dome cap.

6. The dome cap assembly of claim 5, wherein the sealing element is a sacrificial or crush gasket that forms a seal between the shoulder on the external cylindrical surface of the cylindrical tail plug body and the end face of the cylindrical dome cap body when the cylindrical tail plug is mounted in the internal tail plug receiving aperture of the dome cap.

7. The dome cap assembly of claim 1, wherein internal threads are provided on at least a portion of the internal tail plug receiving aperture, wherein external threads are provided on an external cylindrical surface of the cylindrical tail plug body, and wherein the internal threads mate with the external threads to mount the tail plug in the internal tail plug receiving aperture of the dome cap.

8. The dome cap assembly of claim 7, wherein the internal threads and the external threads are conical threads.

9. The dome cap assembly of claim 7, wherein the internal threads and the external threads are tapered threads.

10. The dome cap assembly of claim 7, wherein the at least one circumferential groove on the tail plug is located on the external cylindrical surface of the cylindrical tail plug body such that as the cylindrical tail plug body is unscrewed from the cylindrical dome cap body to remove the cylindrical tail plug body from the internal tail plug receiving aperture, the at least one circumferential groove will pass beyond the end face of the cylindrical dome cap body while the internal and external threads remain engaged.

11. The dome cap assembly of claim 1, wherein the dimensions of the internal tail plug receiving aperture and the cylindrical tail plug body are such that when the cylindrical tail plug body is mounted in the tail plug receiving aperture and the shoulder on the cylindrical tail plug body bears against the end face of the cylindrical dome cap body or the gasket positioned between the shoulder and the end face of the cylindrical dome cap body, the cylindrical tail plug body substantially fills the entire volume of the internal tail plug receiving aperture.

12. The dome cap assembly of claim 1, further comprising a valve core mounted in the internal valve core receiving aperture of the cylindrical dome cap body.

13. The dome cap assembly of claim 1, wherein external threads are formed on the first end of the external cylindrical surface of the cylindrical dome cap body, wherein internal threads are formed on the internal tail plug receiving aperture of the cylindrical dome cap body, and wherein the internal threads are configured to correspond with the external threads.

14. A dome cap assembly for a flow control device, comprising:
a dome cap including:
a cylindrical dome cap body having a first end that is configured to be mounted to a housing of a flow control device;
an internal valve core receiving aperture located at the first end of the cylindrical dome cap body; and
an internal tail plug receiving aperture located at a second end of the cylindrical dome cap body, wherein the tail plug receiving aperture communicates with the internal valve core receiving aperture; and
a tail plug configured to be at least partially mounted in the internal tail plug receiving aperture, the tail plug including:
a cylindrical tail plug body;
a shoulder on the external cylindrical surface of the cylindrical tail plug body, wherein the shoulder is configured to bear against an end face of the cylindrical dome cap body or a gasket positioned between the shoulder and the end face of the cylindrical dome cap body,
wherein an external diameter of the cylindrical tail plug body is greater than 50% of an external diameter of the second end of the cylindrical dome cap body.

15. The dome cap assembly of claim 14, further comprising at least one circumferential groove located on an external cylindrical surface of the cylindrical tail plug body, each at least one circumferential groove being configured to receive a sealing element.

16. The dome cap assembly of claim 14, further comprising a sealing element positioned between the shoulder of the cylindrical tail plug body and the end face of the cylindrical dome cap body when the tail plug is mounted in the internal tail plug receiving aperture of the dome cap.

17. The dome cap assembly of claim 14, wherein internal conical threads are provided on at least a portion of the internal tail plug receiving aperture, wherein external conical threads are provided on an external cylindrical surface of the cylindrical tail plug body, and wherein the internal conical threads mate with the external conical threads to form a seal between the tail plug body and the dome cap body.

18. A dome cap assembly for a flow control device, comprising:
a dome cap including:
a cylindrical dome cap body having a first end that is configured to be mounted to a housing of a flow control device;
an internal valve core receiving aperture located at the first end of the cylindrical dome cap body; and
an internal tail plug receiving aperture located at a second end of the cylindrical dome cap body, wherein internal threads are provided on the tail plug receiving aperture and wherein the tail plug receiving aperture communicates with the internal valve core receiving aperture; and
a tail plug configured to be at least partially mounted in the internal tail plug receiving aperture, the tail plug including:
a cylindrical tail plug body having external threads that are configured to mate with the internal threads on the tail plug receiving aperture to form a seal between the cylindrical tail plug body and the cylindrical dome cap body;
wherein an external diameter of the cylindrical tail plug body is greater than 70% of an external diameter of the second end of the cylindrical dome cap body.

19. The dome cap assembly of claim 18, wherein a shoulder is provided on an external cylindrical surface of the cylindrical tail plug body, wherein the shoulder is configured to bear against an end face of the cylindrical dome cap body or a gasket positioned between the shoulder and the end face of the cylindrical dome cap body to provide a seal between the cylindrical dome cap body and the cylindrical tail plug body.

20. The dome cap assembly of claim 19, wherein the internal threads and the external threads are conical threads.

21. The dome cap assembly of claim 20, wherein at least one circumferential groove is located on an external cylindrical surface of the cylindrical tail plug body, each at least one circumferential groove being configured to receive a sealing element.

* * * * *